(12) United States Patent
Young et al.

(10) Patent No.: US 7,747,254 B2
(45) Date of Patent: Jun. 29, 2010

(54) MANAGEMENT SYSTEM AND METHOD FOR WIRELESS COMMUNICATION NETWORK AND ASSOCIATED USER INTERFACE

(75) Inventors: Ming-Hui Young, Lijhu Township, Taoyuan County (TW); Wei-Ling Chang, Taipei (TW)

(73) Assignee: Groundhog Technologies Inc (TW)

( * ) Notice: Subject to any disclaimer, the term of this patent is extended or adjusted under 35 U.S.C. 154(b) by 981 days.

(21) Appl. No.: 11/455,853

(22) Filed: Jun. 20, 2006

(65) Prior Publication Data

US 2006/0294260 A1    Dec. 28, 2006

Related U.S. Application Data

(60) Provisional application No. 60/693,007, filed on Jun. 23, 2005.

(51) Int. Cl.
*H04Q 7/20* (2006.01)
(52) U.S. Cl. .................. 455/446; 455/423; 455/566
(58) Field of Classification Search .................. 455/457, 455/422.1, 423, 424, 446–449, 566
See application file for complete search history.

(56) References Cited

U.S. PATENT DOCUMENTS

| | | | | |
|---|---|---|---|---|
| 5,644,334 A | * | 7/1997 | Jones et al. | 345/419 |
| 5,960,439 A | * | 9/1999 | Hamner et al. | 707/103 R |
| 6,356,758 B1 | * | 3/2002 | Almeida et al. | 455/446 |
| 7,447,509 B2 | * | 11/2008 | Cossins et al. | 455/457 |

* cited by examiner

*Primary Examiner*—Kamran Afshar

(57) ABSTRACT

A management system and method for a wireless communication network and an associated interface is provided. The management system provides a structure of data layers and a visualization design to upgrade the efficiency of network management. The management system includes a data generation module and a display module. The data module generates a plurality of data layers, which comprise at least a map layer, a network configuration layer, and an operation index layer. The network configuration layer comprises a configuration of the wireless communication network on the map layer. The operation index layer includes statistic values of an operation index of the wireless communication network under the configuration. The display module performs an overlap display of a plurality of selected layers from the data layers to show operation status of the wireless communication network.

26 Claims, 15 Drawing Sheets

 displaying on the top
 displaying
 filtered displaying
 directional displaying
 unable to display
 not displaying
FIG. 4

US 7,747,254 B2

MANAGEMENT SYSTEM AND METHOD FOR WIRELESS COMMUNICATION NETWORK AND ASSOCIATED USER INTERFACE

CROSS-REFERENCE TO RELATED APPLICATIONS

The present application claims the benefit of U.S. Provisional Application No. 60/693,007, filed on Jun. 23, 2005, which is herein incorporated by reference.

BACKGROUND OF INVENTION

1. Field of the Invention

The present invention relates to a wireless communication network, and more particularly, to a management system and method for the wireless communication network and an associated user interface.

2. Description of the Prior Art

In a wireless communication network such as a mobile network, in order to maintain service quality, an efficient network management is needed besides the erection of base stations. When performing the network management, a network administrator is required to monitor complicated network configurations and various operation indexes. However, in a conventional network management system, network operation status is not displayed in an integrated and flexible manner, such that the administrator cannot perform the network management and diagnosis efficiently.

SUMMARY OF INVENTION

It is therefore one objective of the present invention to provide a management system and method for a wireless communication network which provides a structure of data layers for displaying the network operation status fully and flexibly, thereby upgrading the efficiency of network management.

Another objective of the present invention is to provide a management system and method for a wireless communication network which displays the network operation status by a visualization design, thereby performing a network performance diagnosis efficiently.

Another objective of the present invention is to provide a user interface for managing a wireless communication network which facilitates user operation to display the network operation status fully and flexibly, thereby upgrading the efficiency of network management.

According to one embodiment of the present invention, a management system for a wireless communication network is provided. The management system comprises: a data generation module for generating a plurality of data layers, which comprise at least a map layer, at least a network configuration layer comprising a network configuration of the wireless communication network on the map layer, and at least an operation index layer comprising a statistic value of an operation index of the wireless communication network under the network configuration; and a display module, connected to the data generation module, for performing an overlap display of a plurality of selected layers from the data layers to show operation status of the wireless communication network.

According to another embodiment of the present invention, a user interface for managing a wireless communication network is provided. The user interface comprises a data layer window for listing a plurality of data layers, which comprise at least a map layer, at least a network configuration layer comprising a network configuration of the wireless communication network on the map layer, and at least an operation index layer comprising a statistic value of an operation index of the wireless communication network under the network configuration. A plurality of selected layers for an overlap display is selected from the data layers via the user interface.

According to another embodiment of the present invention, a management method for a wireless communication network is provided. The management method comprises steps of: generating a plurality of data layers which comprise at least a map layer, at least a network configuration layer comprising a network configuration of the wireless communication network on the map layer, and at least an operation index layer comprising a statistic value of an operation index of the wireless communication network under the network configuration; and performing an overlap display of a plurality of selected layers from the data layers to show operation status of the wireless communication network.

BRIEF DESCRIPTION OF THE DRAWINGS

A colored version of below drawings for reference is provided as an appendix to this specification.

FIG. 4 is a diagram showing an embodiment of the symbols used to indicate the display status of the data layer.

DETAILED DESCRIPTION

Figure 1:
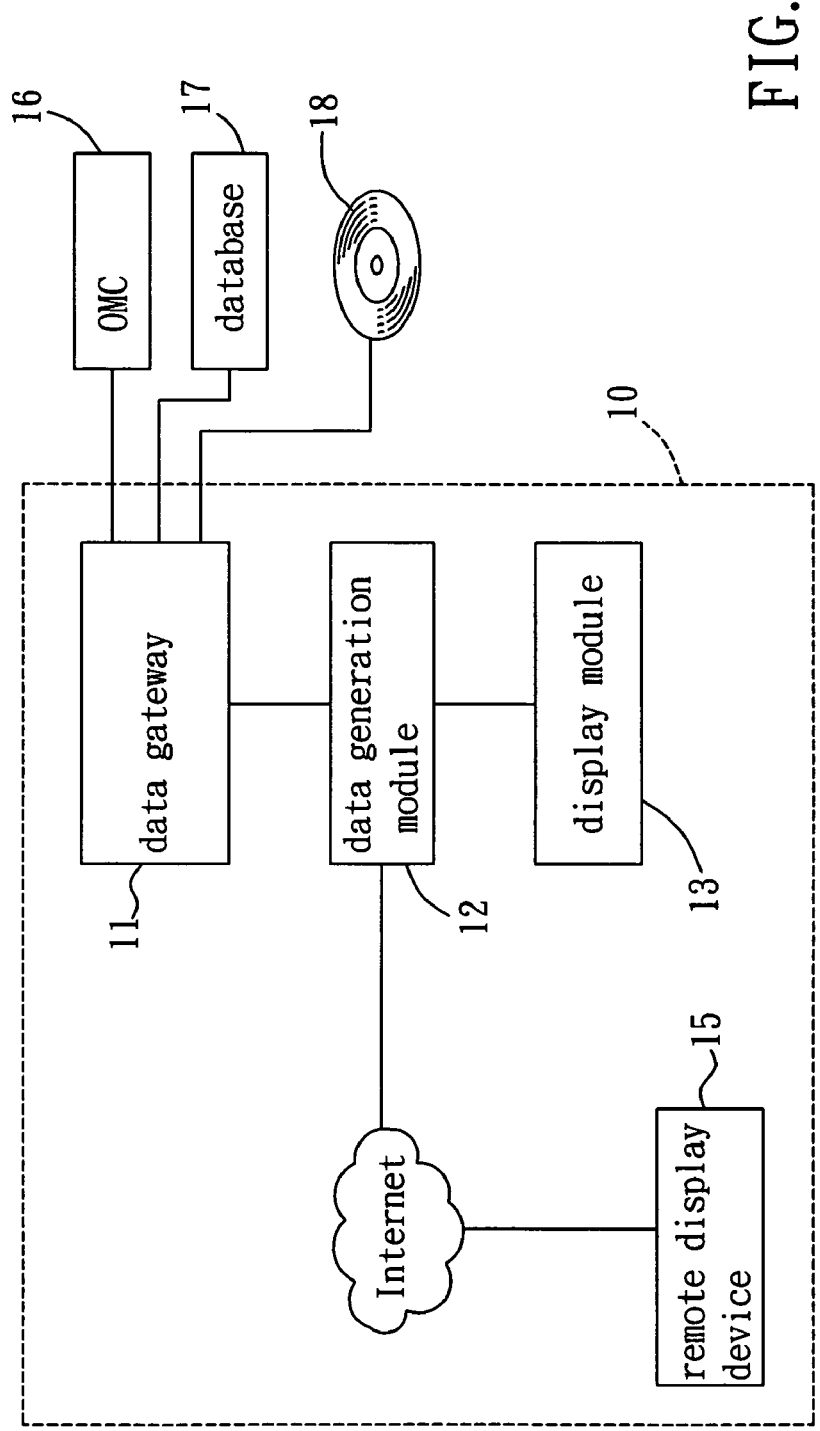
FIG. 1 is an architectural diagram of a preferred embodiment of the management system for a wireless communication network according to the present invention.

Though the embodiments described below may take a GSM network for example, people skilled in the art can easily apply technological features of the present invention to other wireless communication networks. Thus, the scope of the present invention is not limited to the GSM network. FIG. 1 is an architectural diagram of a preferred embodiment of the management system for a wireless communication network according to the present invention. As shown in FIG. 1, the management system 10 includes a data gateway 11, a data generation module 12, and a display module 13. The data gateway 11 collects and preprocesses network statistic data, which record network traffic status or network user behavior during a certain period of time. The network operation status is realized by analyzing the network statistic data. The data gateway 11 collects the network statistic data from various sources, such as an operation and maintenance center (OMC) 16 or operation support system (OSS), a database 17, or an optical disk 18. The OMC 16 usually provides real-time or short-term statistic data, while long-term statistic data are stored in the database 17 and the optical drive 18. It is notable that the data gateway 11 can collect the statistic data from different OMCs provided by different vendors. The different OMCs may produce statistic data based on different criteria, and then the data generation module 12 can analyze the collected statistic data in different perspectives. The preprocessing of the network statistic data means to perform a data validation and a format conversion (e.g. adjusting the statistic data to a uniform time base) thereon to facilitating a subsequent analysis.

The data generation module 12, coupled to the data gateway 11, analyzes the preprocessed statistic data, and generates a plurality of data layers. The data layers include at least a map layer, at least a network configuration layer, and at least an operation index layer. The map layer displays a distribution of various geographical entities, such as roads, rivers, buildings, etc. The network configuration layer displays a configuration of the wireless communication network on the map layer. The configuration of the wireless communication network includes the location and configuration of network elements (e.g. a mobile switching center (MSC), a base station controller (BSC), a base transceiver station (BTS), a cell, etc.), and the distribution of serving areas (e.g. a MSC area, a location area, a BSC area, etc.). The operation index layer displays statistic values of an operation index of the wireless communication network under the network configuration. The operation index reflects a specific network traffic status or network user behavior, and its statistic value can be retrieved or derived from the network statistic data. The types of the operation index are various, such as location update (LU) amount, handover amount, mobile terminating call (MTC) amount, mobile originating call (MOC) amount, paging amount, short message service (SMS) amount, etc. These operation indexes are well known to people skilled in the art and not described in detail here. Besides, in accordance with the request of the network administrator, the operation index can be directly used as a network performance index. Or, different operation indexes can be combined to produce a new operation index as the network performance index. In accordance with the administrator request or actual network operation status, a key performance index (KPI) can be selected from all available operation indexes.

Figure 2:
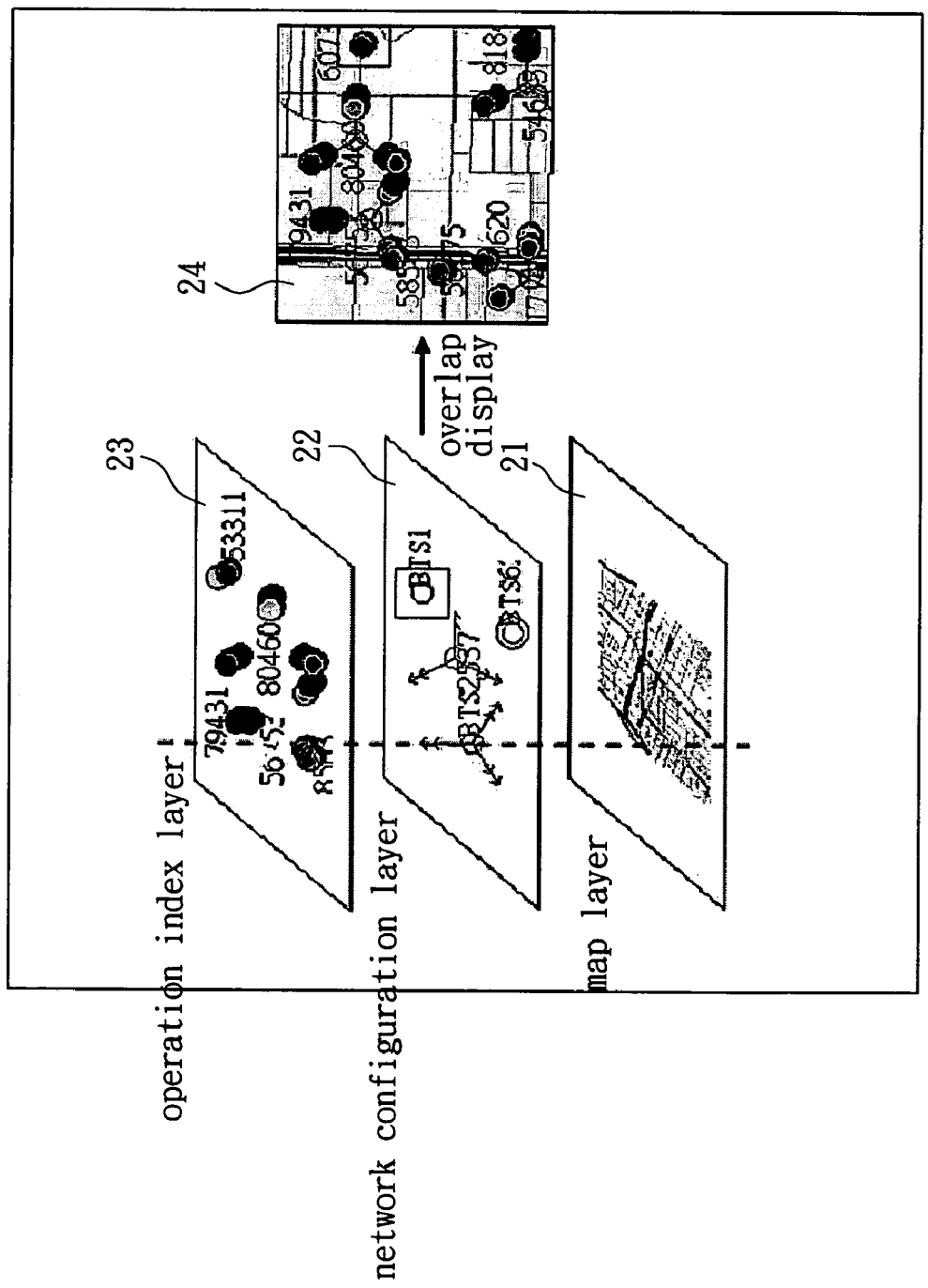
FIG. 2 is a diagram showing how the display module in FIG. 1 performs an overlap display of the selected layers.

The display module 13 is coupled to the data generation module 12, and performs an overlap display of a plurality of selected layers from the data layers, thereby showing operation status of the wireless communication network. FIG. 2 is a diagram showing how the display module 13 performs the overlap display of the selected layers. In FIG. 2, the selected layers include a map layer 21, a network configuration layer 22, and an operation index layer 23. The map layer 21 displays a distribution of geographical entities such as roads, railroads, etc. The network configuration layer 22 displays cell configuration in visual symbols. For example, a small circle represents a BTS, and each radiating line thereof represents a cell of the BTS. The direction of the radiating line is the direction configured for the cell, and the two arrows on the radiating line represent two different communication standards, such as GSM 900 and GSM 1800. In addition, the small circle within a larger circle represents an omni-directional BTS, and the small circle within a square represents a BTS within a building. The operation index layer 23 uses numbers and visual symbols to display the statistic values of the operation index, e.g. circles with different colors denote statistic values in different ranges. The overlap display 24 of the selected layers is then produced to show the network operation status in a visualization manner.

The data generation module 12 can provide a variety of map layers, network configuration layers, and operation index layers. For example, different map layers display geographical entities with different properties, different network configuration layers display network elements or serving areas in different levels, and different operation index layers display statistic values of different operation indexes. A user can manipulate a user interface (described later) provided by the display module 13 to select the data layers to be overlappingly displayed. Besides, in accordance with a user request, the display module 13 can execute a software such as a wizard program to add a customized data layer into the data layers of the data generation module 12. The content of the customized data layer is designed according to the user request. For example, the customized data layer can be designed as an operation index layer including a KPI created by the user itself.

As shown in FIG. 1, the management system 10 further includes a remote display device 15, which connects to the data generation module 12 via a connecting means such as the Internet and selects the selected layers for an overlap display. In this way, a user can manage the wireless communication system in a remote side.

Figure 3:
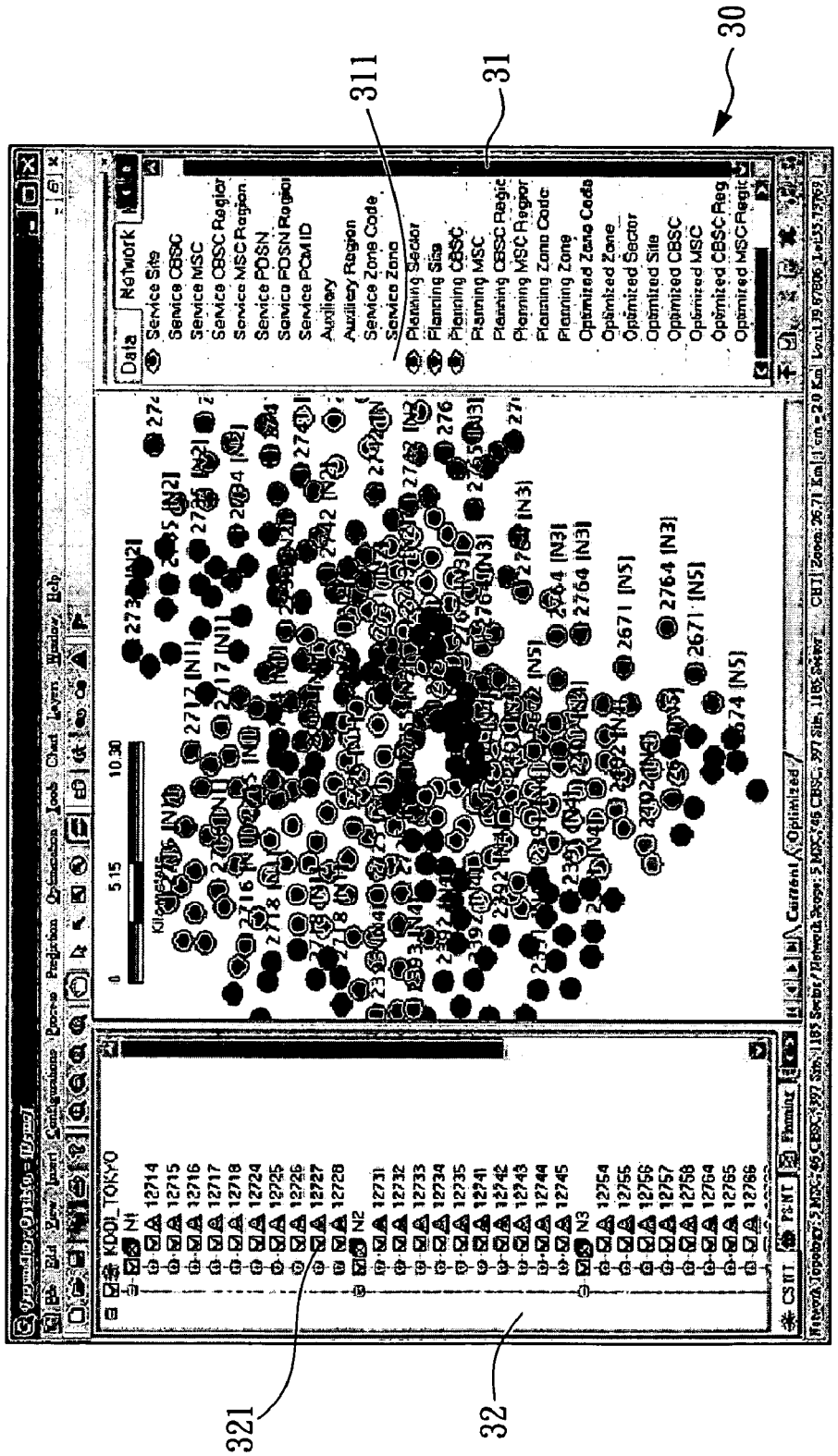
FIG. 3 is a diagram showing an embodiment of the user interface provided by the display module in FIG. 1.

FIG. 3 is a diagram showing an embodiment of the user interface provided by the display module 13. In this embodiment, the user interface 30 includes a data layer window 31 for listing the data layers provided by the data generation module 12. Also, for each data layer, the data layer window 31 includes a status field 311 for indicating a display status of the corresponding data layer by various symbols. The display status is one of the following: displaying, not displaying, unable to display, displaying on the top, filtered displaying, and directional displaying. FIG. 4 shows an embodiment of the symbols used to indicate the display status. Displaying on the top means to put the data layer on the top when performing the overlap display. Filtered displaying means to display only a portion of the data layer which meets a filtering condition. For example, an operation index layer in the status of filtered displaying may only display the statistic values larger than a specific value. Directional displaying means that in a directional operation index layer (e.g. handover amount, which means the times of handovers from one cell to another), the user can select a specific network element via the user interface to display the values of the directional operation index between the specific network element and its neighbors. By configuring the corresponding status field 311 of the data layer, the user can adjust the display status of the data layer to select the data layer for the overlap display (by configuring as displaying or not displaying), or to change the display manner of the data layer (e.g. by configuring as displaying on the top or filtered displaying).

As shown in FIG. 3, the user interface 30 further includes a network tree graph 32 to display a tree structure of network elements of the wireless communication network. The network elements are arranged as a hierarchy where an upper element manages at least one lower element. For instance, in a GSM network, the hierarchy may contain MSC, BSC, BTS, and cell, from top to bottom. The network tree graph 32 includes a corresponding selection field 321 for each network element. When the overlap display of the selected layers is performed, the user can configure the selection field 321 (by checking or unchecking) to determine whether to display the corresponding network element. Thus, the user can conveniently select the network element to be monitored, thereby preventing from the interference of other irrelevant data.

In the preferred embodiment of FIG. 1, the display module 13 performs the overlap display of the selected layers to show the network operation status, and the network configuration layer and operation index layer can employs a variety of visual patterns to display data on the map layer. These visual patterns are described as follows:

(1) The network configuration layer distinguishes the serving areas by color. For example, different serving areas are distinguished by different colors in FIG. 5A.

(2) The operation index layer distinguishes statistic values of the operation index by number, color, symbol, shape, or combination of above. For example, in FIG. 5A, the operation index of location update (LU) attempt amount is displayed by numbers and circles with different colors. Each circle represents the LU attempt amount of a cell, and different colors represent different statistic value ranges.

(3) The operation index layer distinguishes from another operation index layer by color, symbol, shape, or combination of above. For example, in FIG. 5B, a triangle and a circle are used to represent the drop call amount and the call attempt amount of a cell respectively. Further, different colors represent different statistic value ranges for the same operation index.

Figure 5A:
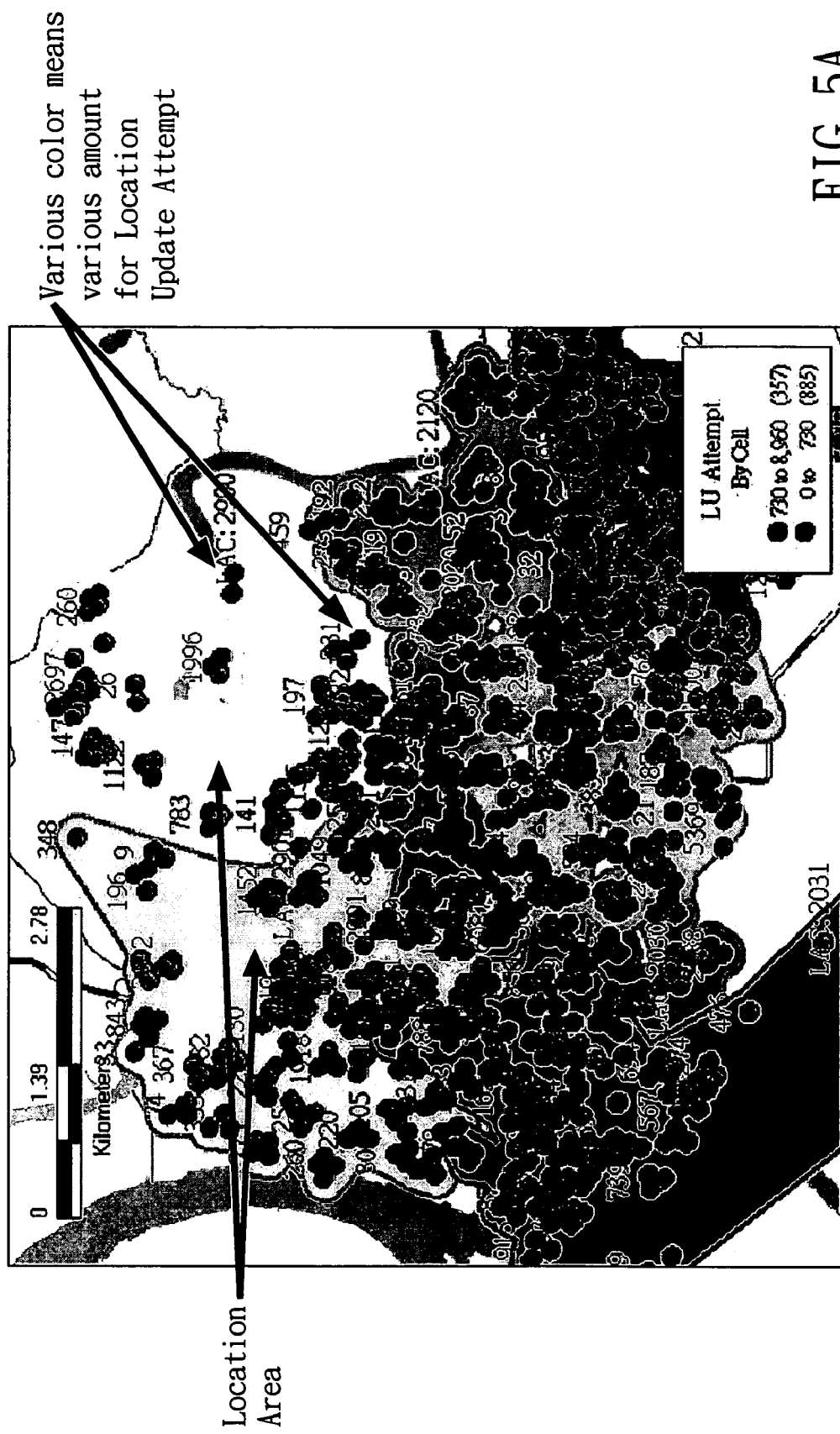
FIG. 5A to 5E are diagrams showing the visualizing patterns of the network configuration layer and operation index layer.

(4) The operation index layer distinguishes the operation index within different serving areas by color, symbol, shape, or combination of above. For example, in FIG. 5C, circles with different colors represent the handover amount within different BSC areas, and the larger the circle is, the larger the handover amount is.

(5) When the operation index is corresponding to a cell pair, the operation index layer distinguishes whether the cell pair belongs to different serving areas by color, symbol, shape, or combination of above. For example, in FIG. 5C, the red color represents the handover amount across the serving area boundary, i.e. the two cells of the corresponding cell pair belong to different serving areas. Besides, other colors represent the handover amount generated within the same serving area.

Figure 5B:
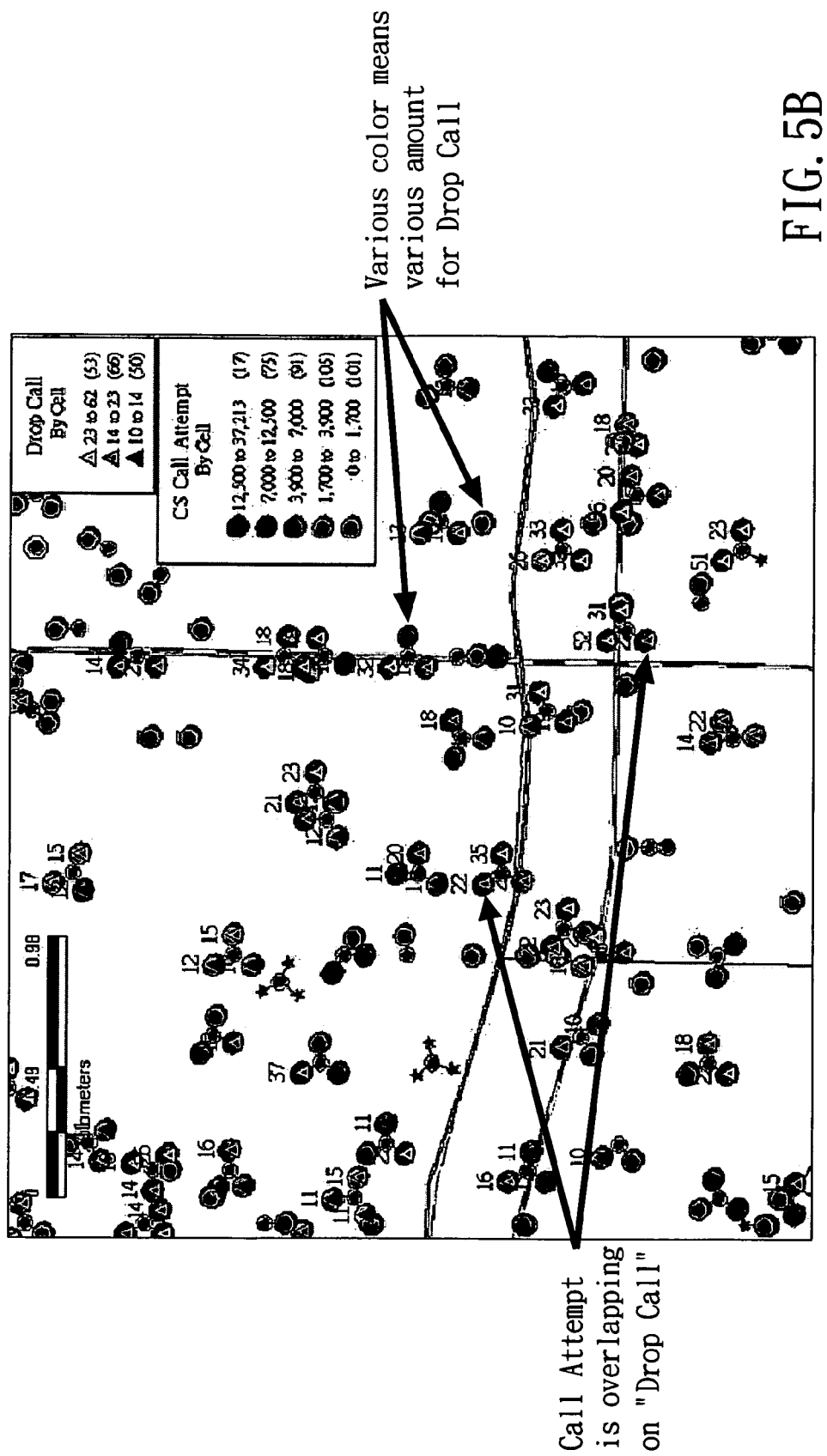
Figure 5C:
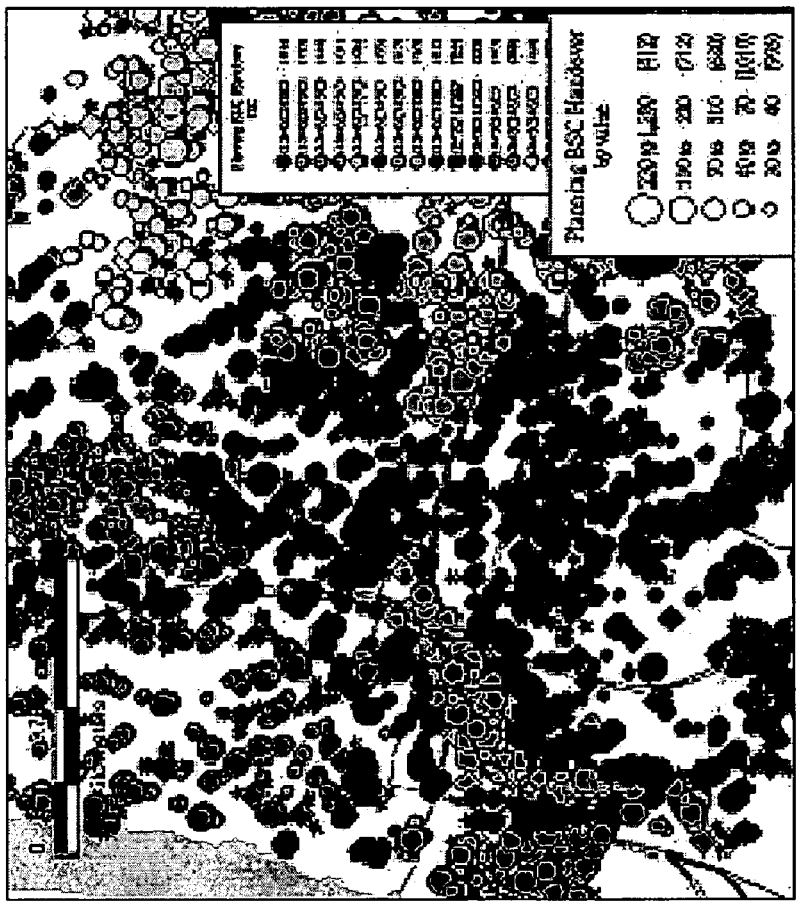
Figure 5D:
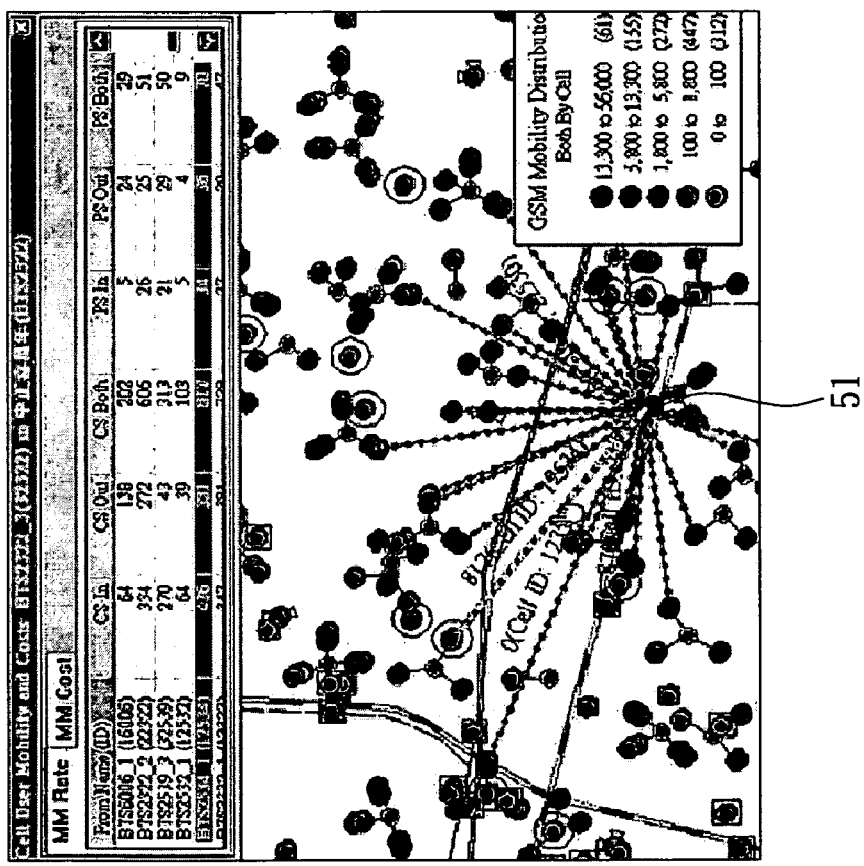
Figure 5E:
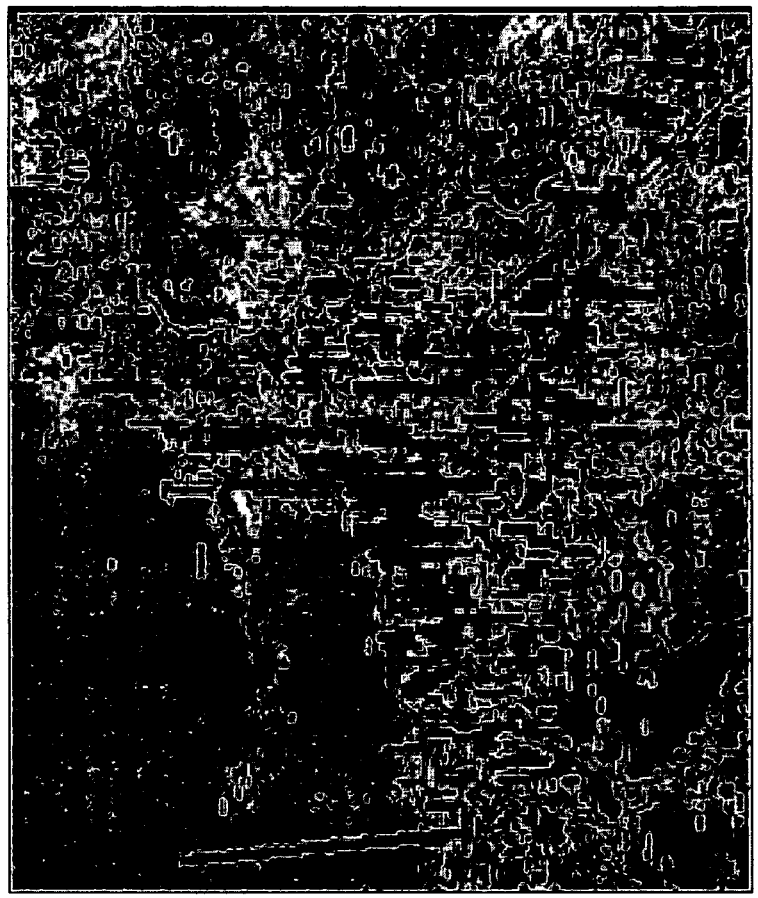

(6) When the operation index is corresponding to a cell pair, the operation index layer displays statistic values of the operation index between a selected cell and its neighbors. That is, the operation index layer is in the status of directional displaying as described above. For example, FIG. 5D shows the operation index of mobility amount among cells. The mobility means that the medium via which a mobile unit (e.g. a mobile phone) connects to the network is changed from a cell to its neighboring cell. When the user selects a cell 51, the mobility amount between the cell 51 and its neighboring cell is displayed by a corresponding radiating line, and different line colors represent different mobility amounts.

The shape in the visual patterns described in (2) to (5) can also be a three-dimensional (3D) shape. For example, cuboids with different heights and colors are used to represent different statistic values of the operation index.

Figure 6:
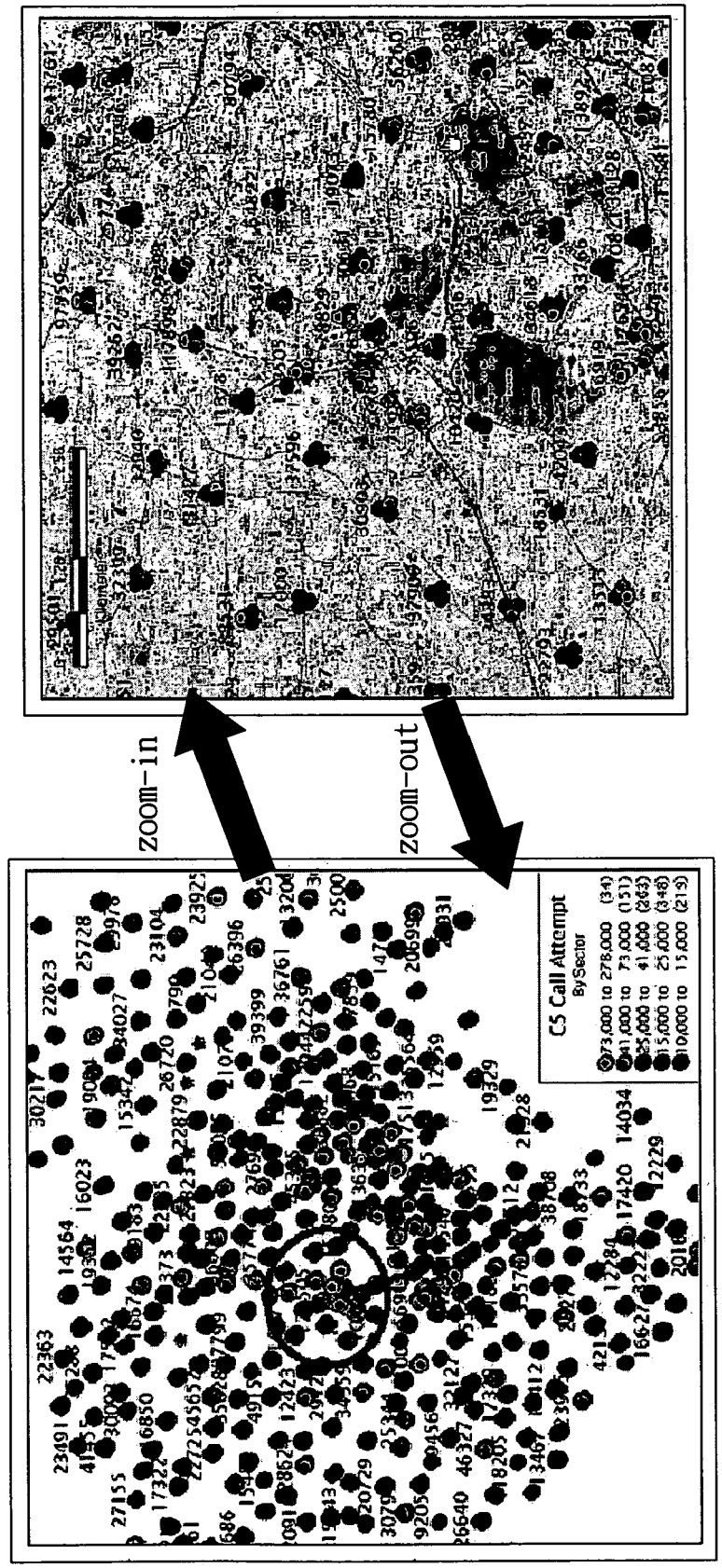
FIG. 6 is a diagram showing an example of performing a zoom-in and zoom-out display.
Figure 7:
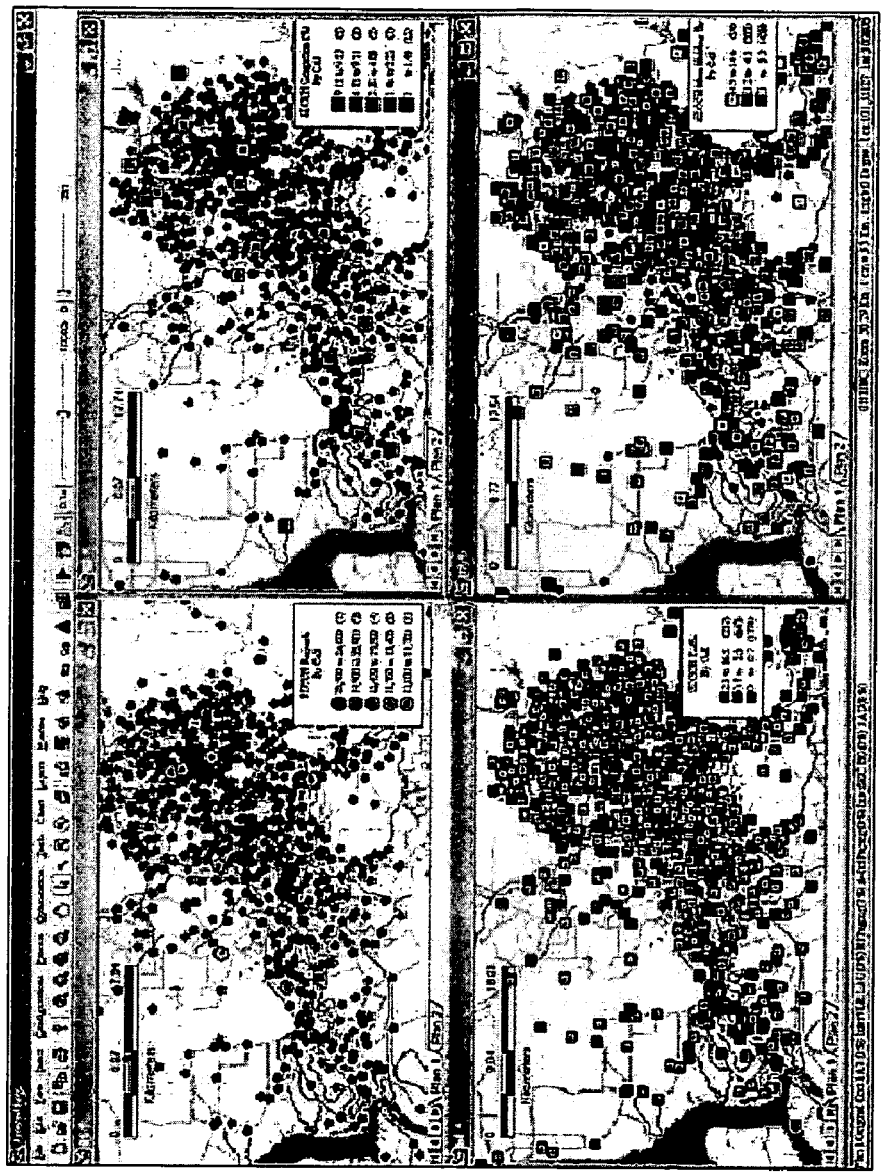
FIG. 7 is a diagram showing that four groups of data layers are displayed in parallel.

Furthermore, the display module 13 is provided with other functions when performing the overlap display. For example, the display module 13 can perform a zoom-in or zoom-out display. In FIG. 6, the right illustration is a zoom-in display of the circle portion within the left illustration. Another example is that the display module 13 can select a plurality of groups of data layers from the data generation module 12, and displays these groups of data layers in parallel, where each group of data layers is respectively overlappingly displayed. When each group of data layers includes a different operation index layer, multiple operation indexes can be monitored simultaneously and efficiently by means of the parallel display. In FIG. 7, four groups of data layers are displayed in parallel. In addition, when the wireless communication network includes a plurality of sub-networks conforming to different communication standards, such as 2G and 3G mobile networks, the display module 13 can distinguish the network configuration and operation index of the different sub-networks by applying the above visual patterns, thereby displaying the operation status of these sub-networks simultaneously. This brings the network administrator the advantage of performing a network performance diagnosis and analyzing its possible causes efficiently, especially when the operation of the sub-networks influences each other.

Figure 8A:
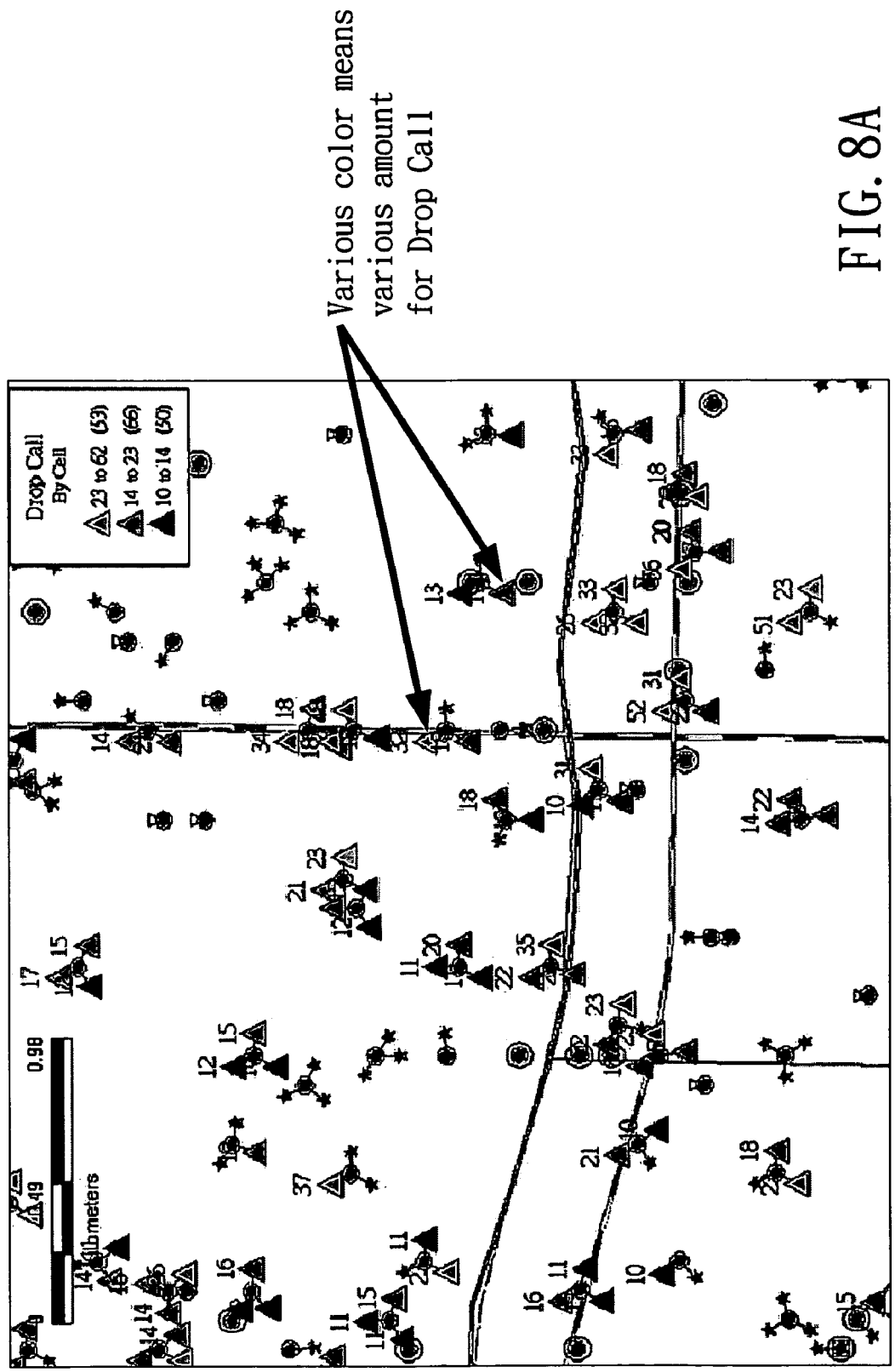
FIG. 8A is a diagram showing only an operation index layer of drop call amount.
Figure 8B:
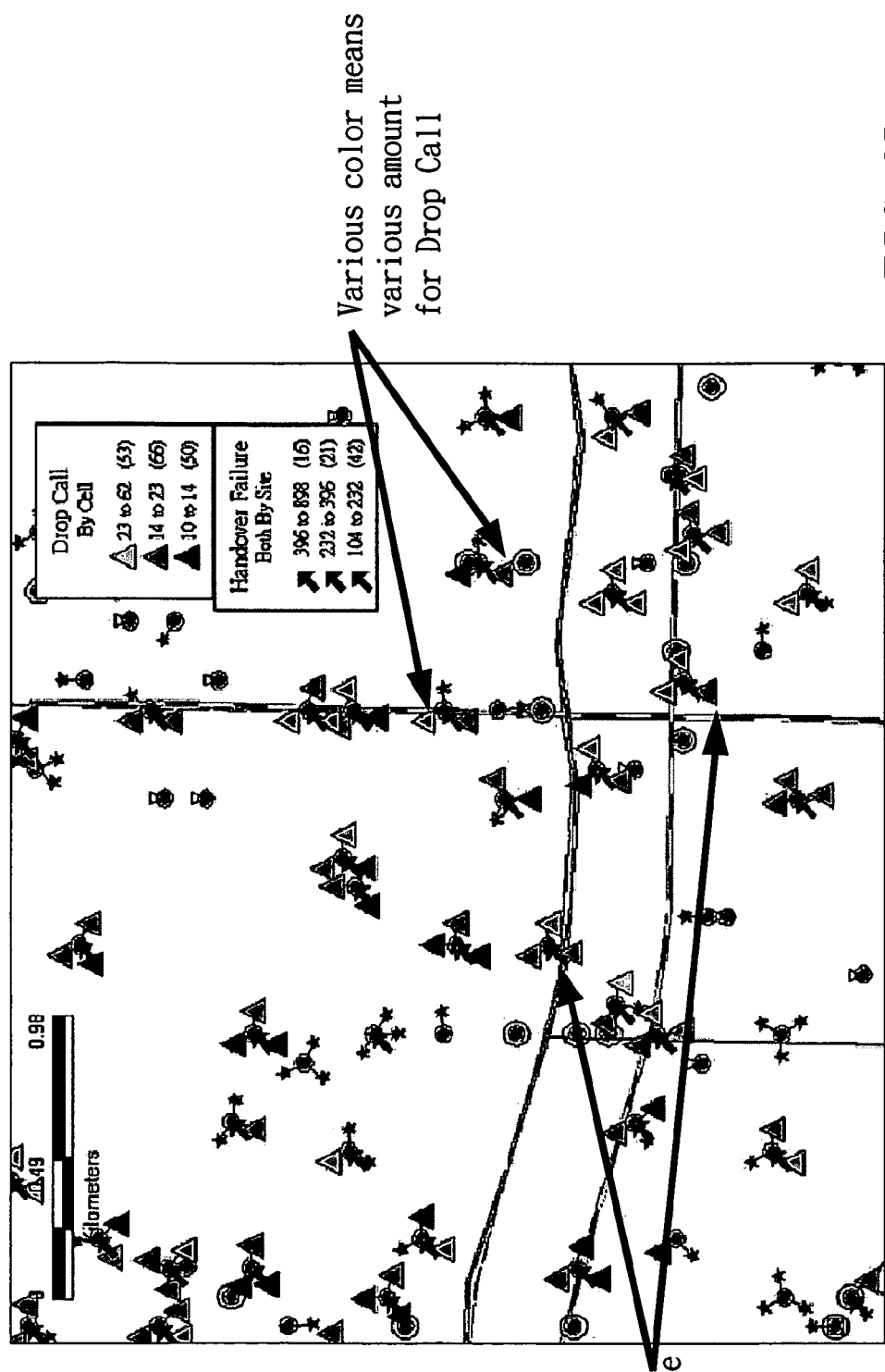
FIG. 8B is a diagram showing an overlap display of two operation index layers of drop call amount and handover failure amount.

In the preferred embodiment of FIG. 1, since the selected layers are overlappingly displayed, the user or network administrator can perform a network performance diagnosis by directly observing correlation between the selected layers. For instance, if the selected layers include a network configuration layer and an operation index layer, then the correlation between the network configuration and the operation index can be observed; if the selected layers include at least two operation index layers, then the correlation between the two operation indexes can be observed. Besides, by overlappingly displaying a map layer, a network configuration layer, and an operation index layer, the correlation among geographical entities, the network configuration, and the operation index can also be observed. Several examples are described as follows:

(A) Two operation index layers of drop call amount and handover failure amount are overlappingly displayed: FIG. 8A shows only the layer of drop call amount, wherein the symbols of ⊚ and ☆ represent a BTS and a cell respectively, and triangles with different colors represent the drop call amounts in different ranges. In order to analyze the possible cause of a high drop call amount, the layer of handover failure amount is overlapped on that of drop call amount, as shown in FIG. 8B. In FIG. 8B, triangles and arrows represent drop call amounts and handover failure amounts, and the cause of the high drop call amount may be found by directly observing the correlation between these two operation indexes, e.g. whether a high handover failure amount brings the high drop call amount.

(B) Two operation index layers of drop call amount and call attempt amount are overlappingly displayed: FIG. 8A shows only the layer of drop call amount. In order to analyze the possible cause of a high drop call amount, the layer of call attempt amount is overlapped on that of drop call amount, as shown in FIG. 5B. In FIG. 5B, triangles and circles represent drop call amounts and call attempt amounts, and the cause of the high drop call amount may be found by directly observing the correlation between these two operation indexes, e.g. whether a high call attempt amount brings the high drop call amount.

Figure 9:
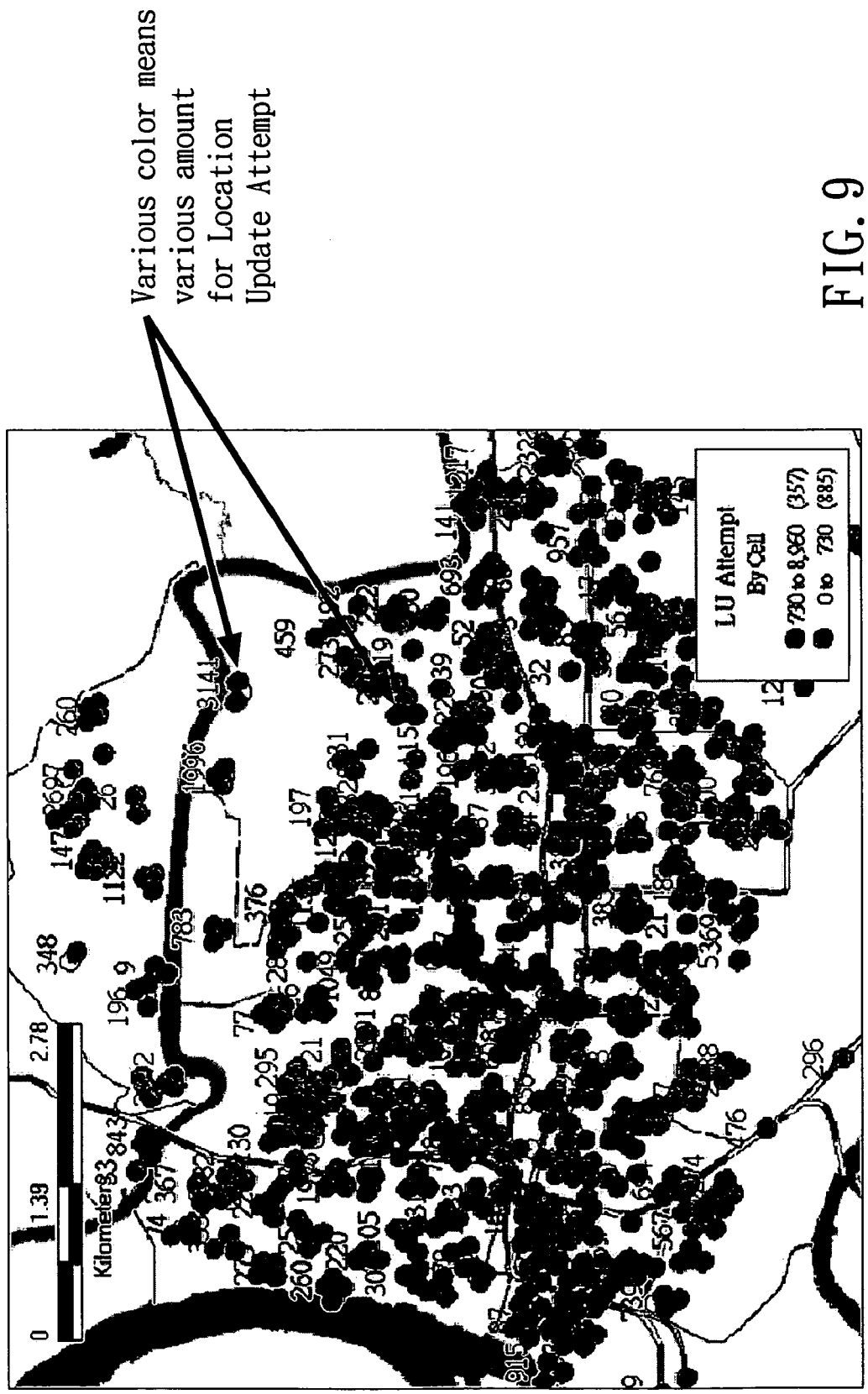
FIG. 9 is a diagram showing only an operation index layer of location update attempt amount.

(C) An operation index layer of location update attempt amount and a network configuration layer of location area are overlappingly displayed: FIG. 9 shows only the layer of location update (LU) attempt amount, wherein circles with different colors represent the LU attempt amounts in different ranges. In order to analyze the possible cause of a high LU attempt amount, the layer of location area is overlapped on that of LU attempt amount, as shown in FIG. 5A. In FIG. 5A, different location areas are distinguished by different colors, and the cause of the high LU attempt amount may be found by directly observing the correlation between these two layers, e.g. whether the high LU attempt amount occurs on the boundary of the location area.

Figure 10:
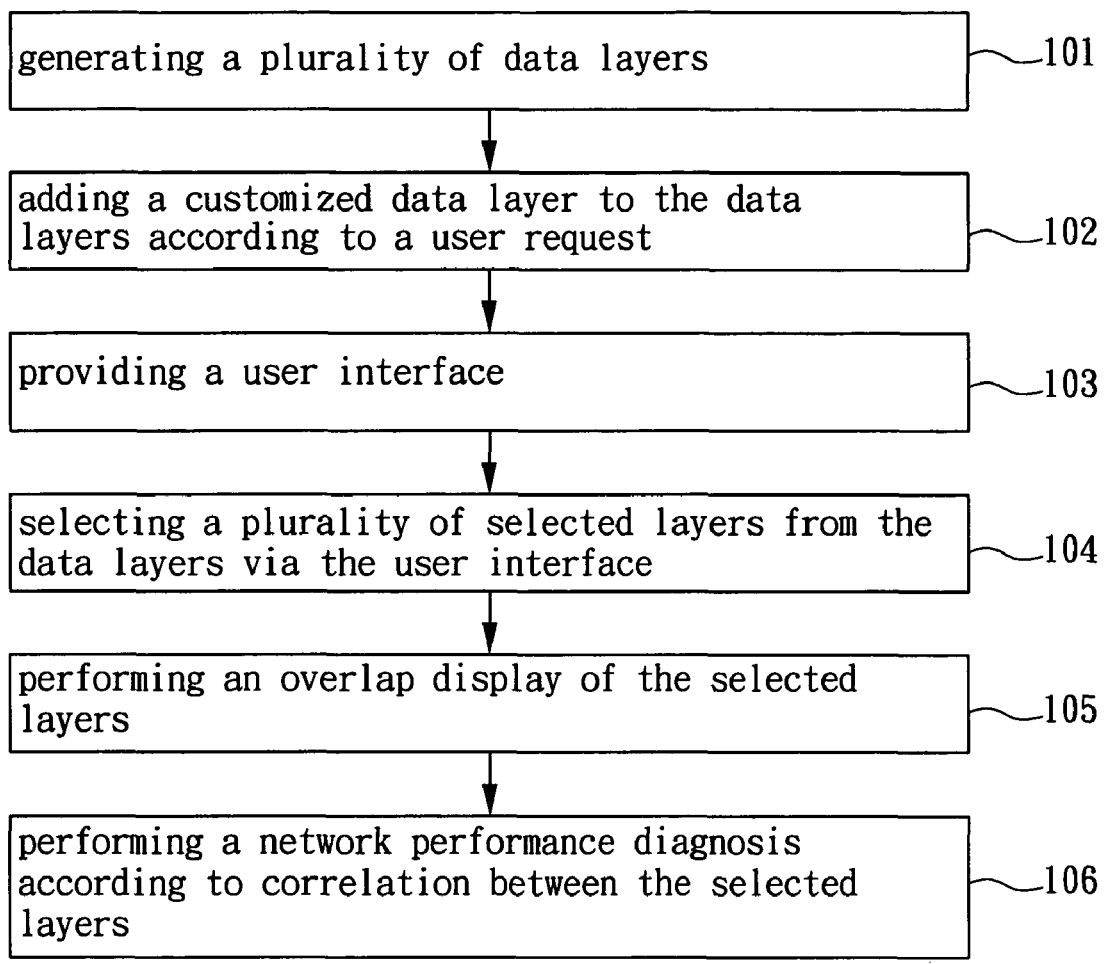
FIG. 10 is a flow chart of a preferred embodiment of the management method for a wireless communication network according to the present invention.

FIG. 10 is a flow chart of a preferred embodiment of the management method for a wireless communication network according to the present invention. The flow in FIG. 10 comprises steps of:

101 generating a plurality of data layers which comprise at least a map layer, at least a network configuration layer, and at least an operation index layer;

102 adding a customized data layer to the data layers according to a user request;

103 providing a user interface which comprises a data layer window for listing the data layers;

104 selecting a plurality of selected layers from the data layers via the user interface;

105 performing an overlap display of the selected layers to show operation status of the wireless communication network; and 106 performing a network performance diagnosis according to correlation between the selected layers.

In step 101, the map layer displays a distribution of various geographical entities, the network configuration layer displays a network configuration of the wireless communication network on the map layer, and the operation index layer displays statistic values of an operation index of the wireless communication network under the network configuration, as described above. In step 102, the content of the customized data layer is designed according to the user request. For example, the customized data layer can be designed as an operation index layer including a KPI created by the user itself. In step 103, for each data layer, the data layer window includes a status field for indicating a display status of the corresponding data layer. In step 104, the selected layers are selected by configuring the corresponding status field of the selected layer to adjust the display status thereof. As to an example of the manner to perform the overlap display in step 105 and the network performance diagnosis in step 106, please refer to the description above.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A management system for a wireless communication network comprising a plurality of cells, the management system comprising:

a data generation module for generating a plurality of data layers, wherein the data layers comprise at least a map layer, at least a network configuration layer comprising a network configuration of the wireless communication network on the map layer, and at least an operation index layer comprising a statistic value of an operation index of the wireless communication network under the network configuration; and a display module, connected to the data generation module, for performing an overlap display of a plurality of selected layers from the data layers to show operation status of the wireless communication network;

wherein when the operation index is corresponding to a cell pair of the wireless communication network, the operation index layer displays the statistic value of the operation index between a selected cell and each neighboring cell of the selected cell by a corresponding radiating line originated from the selected cell, and different colors of the corresponding radiating line represent different amounts of the statistic value.

2. The management system of claim 1, wherein the display module adds a customized data layer to the data layers according to a user request.

3. The management system of claim 1, wherein the display module provides a user interface comprising a data layer window for listing the data layers.

4. The management system of claim 3, wherein for each of the data layers, the data layer window comprises a status field for indicating a display status of the corresponding data layer, wherein the display status is one of the following: displaying, not displaying, unable to display, displaying on the top, filtered displaying, and directional displaying; when the display status of the data layer is filtered displaying, only a portion of the data layer which meets a filtering condition is displayed.

5. The management system of claim 4, wherein the filtering condition for the operation index layer in the display status of filtered displaying is determined by comparing the statistic value of the operation index with a specific value.

6. The management system of claim 1, wherein the display module provides a user interface comprising a network tree graph to display a tree structure of a plurality of network elements of the wireless communication network.

7. The management system of claim 6, wherein the network tree graph comprises a corresponding selection field for each of the network elements, wherein the selection field is configured to determine whether to display the corresponding network element when the overlap display of the selected layers is performed.

8. The management system of claim 1, wherein the network configuration comprises at least one of the following: a location of a network element of the wireless communication network on the map layer, configuration of the network element, and a distribution of a serving area of the wireless communication network on the map layer.

9. The management system of claim 1, wherein the network configuration layer distinguishes serving areas of the wireless communication network by color.

10. The management system of claim 1, wherein the operation index layer distinguishes statistic values of the operation index by number, color, symbol, shape, or combination of above.

11. The management system of claim 1, wherein the operation index layer distinguishes the operation index within different serving areas of the wireless communication network by color, symbol, shape, or combination of above.

12. The management system of claim 11, wherein the shape is a three-dimensional shape.

13. The management system of claim 1, wherein when the operation index is corresponding to the cell pair of the wireless communication network, the operation index layer distinguishes whether the cell pair belongs to different serving areas of the wireless communication network by color, symbol, shape, or combination of above.

14. The management system of claim 1, wherein the operation index layer distinguishes from another operation index layer by color, symbol, shape, or combination of above.

15. The management system of claim 1, wherein a network performance diagnosis is performed according to correlation between the selected layers.

16. The management system of claim 15, wherein the selected layers comprise the network configuration layer and the operation index layer, and the network performance diagnosis is performed according to correlation between the network configuration and the operation index.

17. The management system of claim 15, wherein the selected layers comprise at least two operation index layers, and the network performance diagnosis is performed according to correlation between the operation indexes of the at least two operation index layers.

18. A user interface for managing a wireless communication network comprising a plurality of cells, the user interface comprising:
a data layer window for listing a plurality of data layers, wherein the data layers comprise at least a map layer, at least a network configuration layer comprising a network configuration of the wireless communication network on the map layer, and at least an operation index layer comprising a statistic value of an operation index of the wireless communication network under the network configuration;
wherein a plurality of selected layers for an overlap display is selected from the data layers via the user interface;
wherein when the operation index is corresponding to a cell pair of the wireless communication network, the operation index layer displays the statistic value of the operation index between a selected cell and each neighboring cell of the selected cell by a corresponding radiating line originated from the selected cell, and different colors of the corresponding radiating line represent different amounts of the statistic value.

19. The user interface of claim 18, wherein for each of the data layers, the data layer window comprises a status field for indicating a display status of the corresponding data layer, wherein the display status is one of the following:
displaying, not displaying, unable to display, displaying on the top, filtered displaying, and directional displaying.

20. The user interface of claim 19, wherein the display status of the data layer is adjusted by configuring the corresponding status field of the data layer.

21. The user interface of claim 18, further comprising:
a network tree graph for displaying a tree structure of a plurality of network elements of the wireless communication network.

22. The user interface of claim 21, wherein the network tree graph comprises a corresponding selection field for each of the network elements, wherein the selection field is configured to determine whether to display the corresponding network element when the overlap display of the selected layers is performed.

23. A management method for a wireless communication network comprising a plurality of cells, the management method comprising:
generating a plurality of data layers, wherein the data layers comprise at least a map layer, at least a network configuration layer comprising a network configuration of the wireless communication network on the map layer, and at least an operation index layer comprising a statistic value of an operation index of the wireless communication network under the network configuration; and
performing an overlap display of a plurality of selected layers from the data layers to show operation status of the wireless communication network;
wherein when the operation index is corresponding to a cell pair of the wireless communication network, the operation index layer displays the statistic value of the operation index between a selected cell and each neighboring cell of the selected cell by a corresponding radiating line originated from the selected cell, and different colors of the corresponding radiating line represent different amounts of the statistic value.

24. The management method of claim 23, further comprising:
adding a customized data layer to the data layers according to a user request.

25. The management method of claim 23, further comprising:
providing a user interface which comprises a data layer window for listing the data layers; and
selecting the selected layers from the data layers via the user interface.

26. The management method of claim 23, further comprising:
performing a network performance diagnosis according to correlation between the selected layers.

* * * * *